United States Patent
Kannan et al.

(10) Patent No.: US 8,019,837 B2
(45) Date of Patent: Sep. 13, 2011

(54) PROVIDING NETWORK IDENTITY FOR VIRTUAL MACHINES

(75) Inventors: Kalapriya Kannan, Karnataka (IN); Anuradha Bhamidipaty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 12/353,676

(22) Filed: Jan. 14, 2009

(65) Prior Publication Data

US 2010/0180014 A1  Jul. 15, 2010

(51) Int. Cl.
*G06F 15/177* (2006.01)
(52) U.S. Cl. ........ 709/220; 709/221; 709/222; 709/245; 370/328; 370/338; 370/400; 370/466
(58) Field of Classification Search .......... 709/220–222, 709/245; 370/328, 338, 400, 466
See application file for complete search history.

(56) References Cited

U.S. PATENT DOCUMENTS

| | | | | |
|---|---|---|---|---|
| 6,101,543 A * | 8/2000 | Alden et al. | ................... | 709/229 |
| 6,684,243 B1 | 1/2004 | Euget et al. | | |
| 6,697,377 B1 * | 2/2004 | Ju et al. | ................... | 370/466 |
| 6,832,321 B1 * | 12/2004 | Barrett | ................... | 726/11 |
| 6,992,994 B2 * | 1/2006 | Das et al. | ................... | 370/328 |
| 7,002,932 B1 * | 2/2006 | Young et al. | ................... | 370/312 |
| 7,039,008 B1 * | 5/2006 | Howes et al. | ................... | 370/220 |
| 7,111,065 B2 * | 9/2006 | Davidson et al. | ................... | 709/227 |
| 7,117,258 B2 | 10/2006 | Lee et al. | | |
| 7,165,258 B1 * | 1/2007 | Kuik et al. | ................... | 719/326 |
| 7,197,585 B2 * | 3/2007 | Farrell et al. | ................... | 710/200 |
| 7,254,119 B2 * | 8/2007 | Jiang et al. | ................... | 370/328 |
| 7,298,702 B1 * | 11/2007 | Jones et al. | ................... | 370/235 |
| 7,349,412 B1 * | 3/2008 | Jones et al. | ................... | 370/401 |
| 7,373,661 B2 * | 5/2008 | Smith et al. | ................... | 726/15 |
| 7,383,327 B1 * | 6/2008 | Tormasov et al. | ........... | 709/220 |
| 7,383,374 B2 * | 6/2008 | Yamada et al. | ................... | 711/6 |
| 7,437,477 B2 * | 10/2008 | Kuik et al. | ................... | 709/238 |
| 7,478,173 B1 * | 1/2009 | Delco | ................... | 709/250 |
| 7,489,659 B2 * | 2/2009 | Siorpaes et al. | ............... | 370/331 |
| 7,515,589 B2 * | 4/2009 | Bacher et al. | ................... | 370/392 |
| 7,529,867 B2 * | 5/2009 | McCrory et al. | ................... | 710/52 |
| 7,554,967 B1 * | 6/2009 | Varadhan et al. | ............... | 370/352 |
| 7,577,722 B1 * | 8/2009 | Khandekar et al. | ........... | 709/220 |
| 7,633,909 B1 * | 12/2009 | Jones et al. | ................... | 370/338 |

(Continued)

FOREIGN PATENT DOCUMENTS

WO    WO 98/05146    2/1998

(Continued)

OTHER PUBLICATIONS

Wikipedia, Hypervisor, Nov. 16, 2010, pp. 1-5.*

(Continued)

*Primary Examiner* — John Follansbee
*Assistant Examiner* — Backhean Tiv
(74) *Attorney, Agent, or Firm* — Ryan, Mason & Lewis, LLP

(57) ABSTRACT

Techniques for assigning an internet protocol (IP) address to a virtual machine are provided. The techniques include tunneling a request for an IP address to an initialization protocol server, using the server to mask an identity of one or more guest virtual machines and obtain an IP address for the virtual machine based on a media access control (MAC) address of the virtual machine, and tunneling the IP address to the virtual machine.

20 Claims, 2 Drawing Sheets

U.S. PATENT DOCUMENTS

| | | | |
|---|---|---|---|
| 7,660,322 B2* | 2/2010 | Kiel et al. | 370/413 |
| 7,778,189 B2* | 8/2010 | Valli et al. | 370/244 |
| 7,793,307 B2* | 9/2010 | Gokhale et al. | 719/324 |
| 7,802,000 B1* | 9/2010 | Huang et al. | 709/228 |
| 7,873,012 B2* | 1/2011 | Sadot et al. | 370/331 |
| 2004/0249960 A1* | 12/2004 | Hardy et al. | 709/229 |
| 2005/0120247 A1* | 6/2005 | Barrett | 713/201 |
| 2006/0045089 A1* | 3/2006 | Bacher et al. | 370/392 |
| 2006/0106939 A1* | 5/2006 | Cha et al. | 709/230 |
| 2007/0064661 A1* | 3/2007 | Sood et al. | 370/338 |
| 2007/0079307 A1* | 4/2007 | Dhawan et al. | 718/1 |
| 2007/0101323 A1 | 5/2007 | Foley et al. | |
| 2007/0201490 A1* | 8/2007 | Mahamuni | 370/395.54 |
| 2007/0223489 A1* | 9/2007 | Larson et al. | 370/395.5 |
| 2007/0248085 A1* | 10/2007 | Volpano | 370/389 |
| 2008/0059556 A1* | 3/2008 | Greenspan et al. | 709/201 |
| 2008/0080519 A1* | 4/2008 | Park et al. | 370/395.54 |
| 2008/0086725 A1* | 4/2008 | Boss et al. | 718/1 |
| 2008/0133208 A1* | 6/2008 | Stringham | 703/20 |
| 2008/0147925 A1* | 6/2008 | Brahmaroutu | 710/62 |
| 2008/0155208 A1* | 6/2008 | Hiltgen et al. | 711/154 |
| 2008/0163211 A1* | 7/2008 | Mizuno | 718/1 |
| 2008/0295095 A1* | 11/2008 | Watanabe et al. | 718/1 |
| 2008/0320594 A1* | 12/2008 | Jiang | 726/24 |
| 2009/0003828 A1* | 1/2009 | So | 398/56 |
| 2009/0077552 A1* | 3/2009 | Sekiguchi et al. | 718/1 |
| 2009/0106405 A1* | 4/2009 | Mazarick et al. | 709/222 |
| 2009/0113073 A1* | 4/2009 | Koide et al. | 709/245 |
| 2009/0125901 A1* | 5/2009 | Swanson | 718/1 |
| 2009/0125902 A1* | 5/2009 | Ghosh et al. | 718/1 |
| 2009/0150463 A1* | 6/2009 | Sekiguchi et al. | 707/204 |
| 2009/0204964 A1* | 8/2009 | Foley et al. | 718/1 |
| 2009/0210427 A1* | 8/2009 | Eidler et al. | 707/10 |
| 2009/0216970 A1* | 8/2009 | Basler et al. | 711/162 |
| 2009/0228629 A1* | 9/2009 | Gebhart et al. | 711/6 |
| 2010/0094990 A1* | 4/2010 | Ben-Yehuda et al. | 709/224 |
| 2010/0095297 A1* | 4/2010 | Sethi et al. | 718/1 |
| 2010/0100878 A1* | 4/2010 | Otani | 718/1 |
| 2010/0125667 A1* | 5/2010 | Soundararajan | 709/227 |
| 2010/0180014 A1* | 7/2010 | Kannan et al. | 709/220 |
| 2010/0199277 A1* | 8/2010 | Galal et al. | 718/1 |

FOREIGN PATENT DOCUMENTS

WO  WO 2006/104324  10/2006

OTHER PUBLICATIONS

VMware, Virtualization Basics, Nov. 21, 2010, pp. 1-2.*
LMtools and fencing, http://communities.vmware.com/message/685251; jsessionid=DF7720A079BD0A6F4A)96D0B0945E503, Nov. 7, 2008.
The Virtual Machine Networking Settings in Virtual PC 2004, http://support.microsoft.com/kb/833134, Jan. 22, 2004.
Willenborg et al., Using Virtual Image Templates to Deploy WebSphere Application Server, May 2007.

* cited by examiner

PROVIDING NETWORK IDENTITY FOR VIRTUAL MACHINES

FIELD OF THE INVENTION

Embodiments of the invention generally relate to information technology, and, more particularly, to virtual machines.

BACKGROUND OF THE INVENTION

Virtual machines are independent machines with separate operating systems (OS) and their software stacks are created within a hosting OS. Each of the virtual machines behaves like any other machine on the network. They have their own network identity (for example, internet protocol (IP) address, net mask, gateway and domain name system (DNS) settings). These virtual machines, as they reside inside a host operating system, do not expose their media access control (MAC) address in non-bridged mode. These are all virtual MAC addresses. The host operating systems use an internal bookkeeping mechanism between the virtual MAC address and its own MAC address so that communication can be enabled between the virtual machines and outside machines.

In non-bridged mode, as the MAC addresses of the virtual machines are not exposed to the outside world, obtaining IP addresses in a zero network configuration is a non-trivial task. Zero network configuration refers to the state when no information about the network is available, which typically happens the first time the virtual machines are booted. Challenges exist in the allocation of internet protocol (IP) addresses in a zero network configuration in a virtualized environment. During the bootstrapping of virtual machines, an IP address has to be assigned.

In existing approaches, this requires human intervention where a human is involved in either manually assigning the IP addresses to the machines after booting up or in assigning a central server where the virtual machines can obtain an IP address and pointing the virtual machines to the central server. Another approach which also involves human intervention is to populate a file with the new IP address and copy it to the host OS. In certain kinds of virtualized environments, the virtual machines might have access to restricted parts of the host OS and can also access the file and obtain the IP address.

All of the above approaches, as they involve human intervention, require that an expert is required to understand the details of the machine configuration and how to assign the IP address to these virtual machines. It is also a major limiting step towards automation of migration of the virtual machines to a new environment, rendering the automation a challenging task.

SUMMARY OF THE INVENTION

Principles and embodiments of the invention provide techniques for providing network identity for virtual machines.

An exemplary method (which may be computer-implemented) for assigning an internet protocol (IP) address to a virtual machine, according to one aspect of the invention, can include steps of tunneling a request for an IP address to a boot-strapping initialization protocol server, using the server to mask an identity of one or more guest virtual machines and obtain an IP address for the virtual machine based on a media access control (MAC) address of the virtual machine, and tunneling the IP address to the virtual machine.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
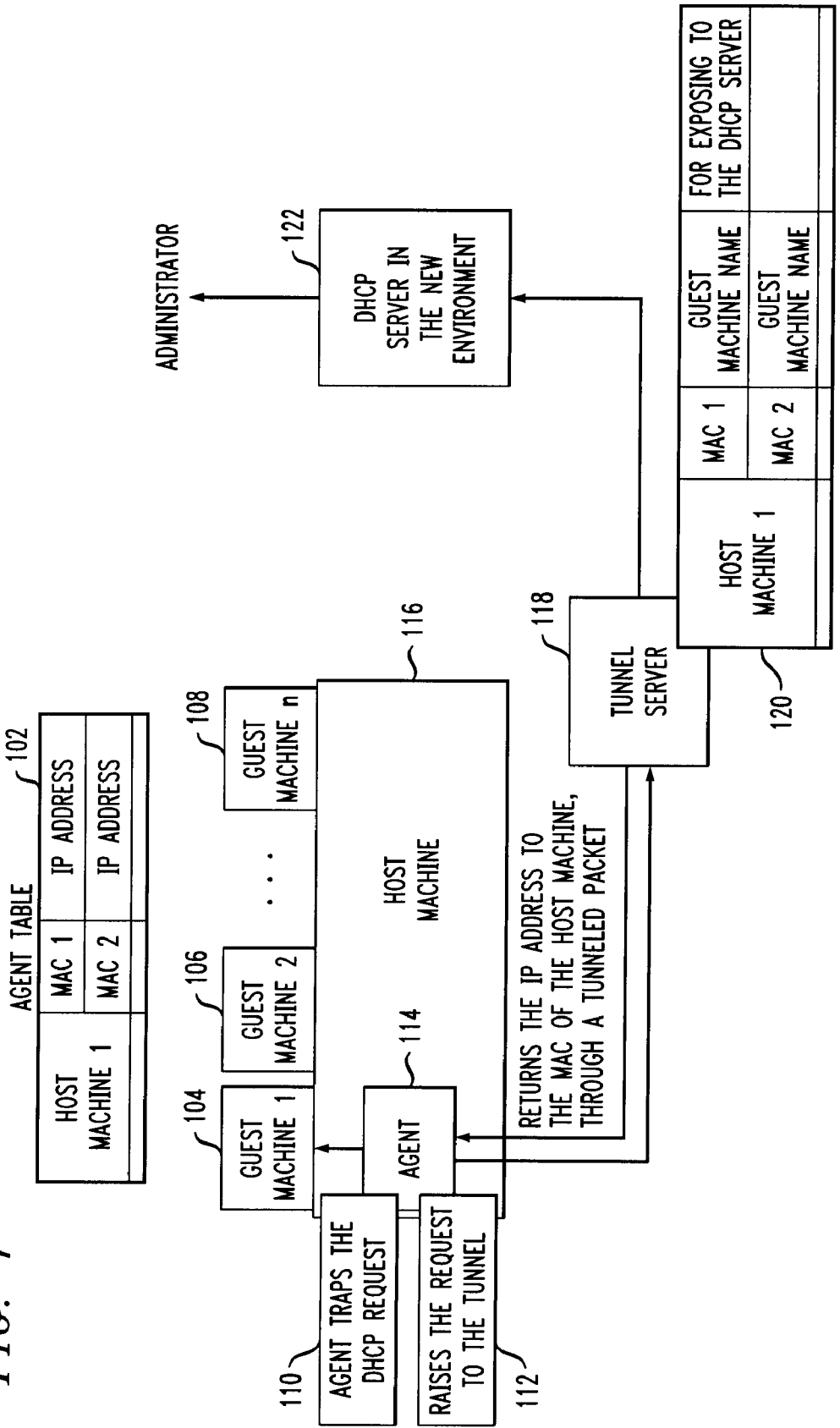
FIG. 1 is a diagram illustrating a system for automatically assigning an internet protocol (IP) address to a virtual machine, according to an embodiment of the present invention.

Principles of the invention include automatically providing network identity for virtual machines in zero configuration networks. The techniques described herein automatically assign internet protocol (IP) addresses to virtual nodes (for example, on boot-up) in a zero network configuration state of the IP addresses.

One or more embodiments of the invention include techniques that tunnel the requests to a boot strapping initialization protocol server such as, for example, a dynamic host configuration protocol (DHCP). The media access control (MAC) address of the virtual nodes is exposed through these tunneling servers to the outside world and an IP address is requested which is again tunneled back to the virtual machine (VM) nodes. In contrast to the disadvantageous existing approaches noted above, the techniques described here reduce human intervention by configuring the DHCP to provide an IP address.

As described herein, in one or more embodiments of the invention, a DHCP server can generate an IP address for the virtual machine based on the MAC address of the virtual machine. As such, the IP address thus generated is tunneled back to the virtual machine.

As noted above, challenges exist in that distributed virtual machines, at boot-up, require an IP address to be assigned thereto. Problems can occur, for example, when boot-up is mis-configured due to invalid network identity or non availability of the IP address. As such, as described herein, one or more embodiments of the invention automatically assign and provide IP addresses for virtual machines upon boot-up, minimizing human intervention for setting up the IP address in the zero network configuration. By way of example, one or more embodiments of the invention automatically assign and provide IP addresses for virtual machines configured in modes that do not expose MAC address to the outside world.

One or more embodiments of the invention install agents on host machines before taking an image. Agents interact with the host machine and obtain the virtual MAC address of the guest machines and develop a host MAC to virtual MAC address. The techniques described herein also set up a virtual tunnel server that interacts with a DHCP server configurable by the administrator to provide the new IP address. Before taking the image, an agent sends the table to the virtual tunnel server and registers the guest host operating system MAC identifier (ID) to the host operating system MAC ID.

When an image is booted-up, it raises a request (by the agent) and is sent to the virtual tunnel server. The virtual tunnel server requests the DHCP server to provide an IP address to the MAC address (configured by the administrator). Also, the virtual tunnel server tunnels these packets to the respective host machine agents. The agents, in-turn, set the MAC address of the individual guest virtual machines. Additionally, in one or more embodiments of the invention, the process steps are done internal to the system and only the administrator is exposed to the interface to configure the IP address.

Also, by way of example, the techniques described herein can be implemented by providing software components that act as an agent on the client machine and also a tunnel server component. The implementation can be performed using any of the languages such as, for example, C/C++/Java, and can be easily deployed on the machines that require the functionality.

As detailed herein, unlike the disadvantageous existing approaches, one or more embodiments of the invention include using an agent to masquerade the identity of the machine for the purpose of obtaining a valid IP address in virtual machines, as well as using the concept of DHCP to enable one to obtain an identity for virtual machines.

FIG. 1 is a diagram illustrating a system for automatically assigning an IP address to a virtual machine, according to an embodiment of the present invention. By way of illustration, FIG. 1 depicts an agent table 102, guest machine 1 104, guest machine 2 106, guest machine n 108 and an agent 114. The agent can trap the DHCP request in step 110 as well as raise the request to the tunnel in step 112. Additionally, FIG. 1 depicts a host machine 116, a tunnel server 118, a mapping table 120 and a DHCP server in the new environment 122. A mapping table 120 maintains the guest operating system MAC address to host operating system mapping explicitly so that it can tunnel the requests out of the host operating system to the DHCP server for individual virtual machines. An agent table 102, on the other hand, maintains the IP address to the MAC address mapping for routing packets to the individual machines.

In FIG. 1, it can be seen that there can be several guest machines (for example, components 104, 106 and 108) on a single host operating system (for example, component 116). The guest machines (for example, component 104) in FIG. 1 register themselves during the process of image capturing with the agent on the host operating system. The component agent table 102 in FIG. 1 refers to the map that this agent maintains to enable communication between the virtual machines and the outside world. This is primarily because the MAC address of the individual virtual machines has to be tunneled or converted to the host operating system MAC address, as the MAC address of the virtual machines are just a virtual IP address.

When the individual virtual machine boots up, it raises a DHCP request for obtaining a new IP address (for example, element 110). The agent traps this DHCP request and raises a request to the tunnel server for a new IP address providing the MAC address of the virtual machines (for example, element 112). The tunnel server (for example, component 118), in turn, maintains another mapping between the VM's MAC and host MAC for exposing it to the DHCP server (for example, component 120). It raises a request to the DHCP server for obtaining a IP address for the MAC of the guest VM, which the tunnel server returns back to the agent and the agent, in turn, returns it back to the guest machine that raised the DHCP request.

Figure 2:
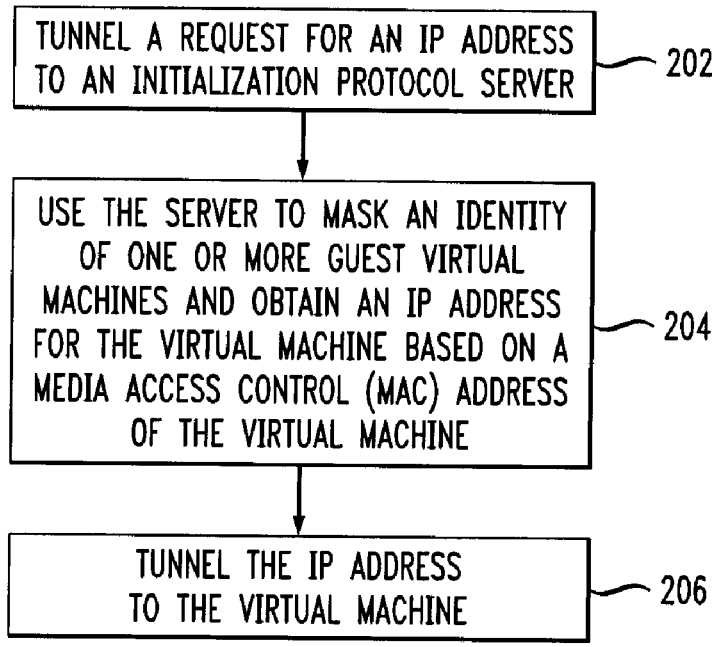
FIG. 2 is a flow diagram illustrating techniques for assigning an internet protocol (IP) address to a virtual machine, according to an embodiment of the present invention.

FIG. 2 is a flow diagram illustrating techniques for assigning (for example, automatically) an internet protocol (IP) address to a virtual machine, according to an embodiment of the present invention. The virtual machine can include, by way of example, a virtual machine configured in one or more modes that do not expose a media access control (MAC) address outside of a host machine. Step 202 includes tunneling a request for an IP address to an initialization protocol server (for example, a boot-strapping initialization protocol server). The initialization protocol server can include, for example, a dynamic host configuration protocol (DHCP). Also, the request for an IP address can be made upon boot-up of the virtual machine.

Step 204 includes using the server to mask an identity of one or more guest virtual machines and obtain an IP address for the virtual machine based on a media access control (MAC) address of the virtual machine. The MAC address of the virtual machine can be exposed through the server (that is, the tunneling server). Step 206 includes tunneling the IP address to the virtual machine.

The techniques depicted in FIG. 2 can also include installing agents on a host machine before taking an image (that is, a snapshot of the virtual machine), wherein the agents interact with the host machine and obtain a virtual MAC address of one or more guest machines and develop a mapping of host MAC to virtual MAC address. Additionally, one or more embodiments of the invention can include setting up a virtual tunnel server, wherein the virtual tunnel server interacts with a boot-strapping initialization protocol server (for example, a DHCP server) configurable by an administrator to provide a new IP address. An agent can maintain a table of the MAC address to IP address mapping of the individual guest machines and send a request to the virtual tunnel server and registers a guest host operating system MAC identifier to a host operating system MAC identifier.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 3:
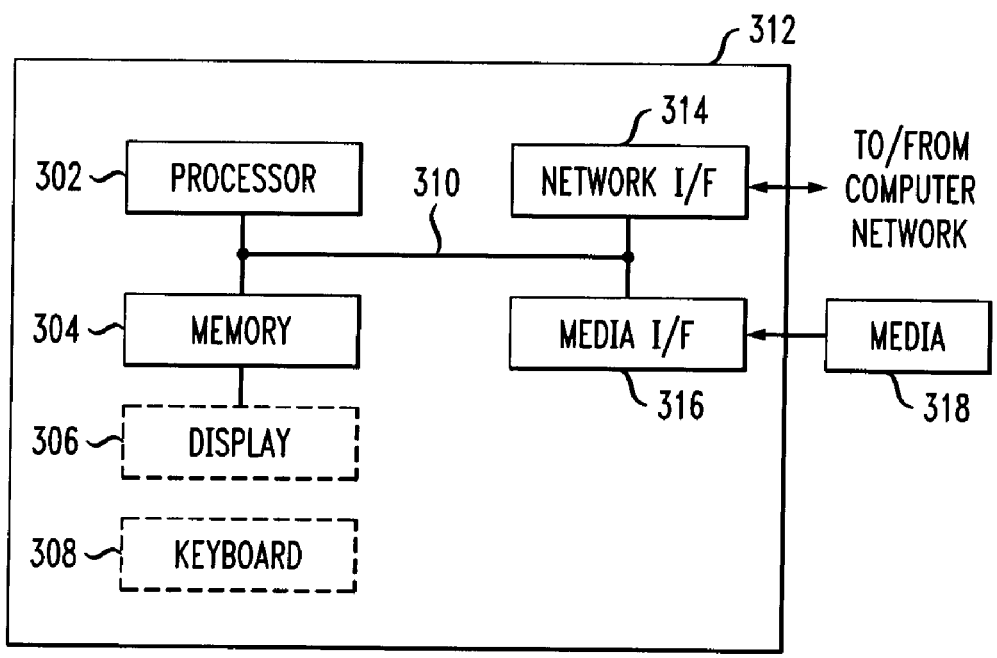
FIG. 3 is a system diagram of an exemplary computer system on which at least one embodiment of the present invention can be implemented.

At present, it is believed that the preferred implementation will make substantial use of software running on a general-purpose computer or workstation. With reference to FIG. 3, such an implementation might employ, for example, a processor 302, a memory 304, and an input and/or output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 302, memory 304, and input and/or output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 304), magnetic tape, a removable computer diskette (for example, media 318), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, using an agent to masquerade the identity of a machine for the purpose of obtaining a valid IP address in virtual machines.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for assigning an internet protocol (IP) address to a virtual machine, comprising the steps of:
   tunneling a request for an IP address from one or more guest virtual machines to a dynamic host configuration protocol (DHCP) server upon boot-up of the one or more guest virtual machines, comprising:
   an agent on a host machine trapping the request from the virtual machine; and
   the agent requesting from a tunnel server the IP address for each guest virtual machine by providing a media access control (MAC) address of each guest virtual machine;
   the tunnel server mask an identity of the one or more guest virtual machines and obtain an IP address for the one or more guest virtual machines based on the media access control (MAC) address of each guest virtual machine comprising:
   maintaining at the tunnel server, a mapping between each guest virtual machine media access control (MAC) address and a media access control (MAC) address for the host machine for exposure to the dynamic host configuration protocol (DHCP) server; and
   the tunnel server requesting from the dynamic host configuration protocol (DHCP) server an IP address for the media access control (MAC) address of the one or more guest virtual machines;
   sending to the tunnel server from the dynamic host configuration protocol (DHCP) the IP address of one or more virtual machines; and
   the tunnel server tunneling the IP address to the one or more virtual machines via the agent.

2. The method of claim 1, wherein the MAC address of the virtual machine is exposed through the tunnel server.

3. The method of claim 1, further comprising installing one or more agents on a host machine before taking an image, wherein the one or more agents interact with the host machine and obtain a virtual MAC address of one or more guest machines and develop a host MAC to virtual MAC address.

4. The method of claim 1, further comprising setting up a virtual tunnel server, wherein the virtual tunnel server interacts with a boot-strapping dynamic host configuration protocol (DHCP) server configurable by an administrator to provide a new IP address.

5. The method of claim 4, wherein an agent maintains a table of the MAC address to IP address mapping of the individual guest virtual machines.

6. The method of claim 4, wherein an agent registers a guest host operating system MAC identifier to a host operating system MAC identifier.

7. The method of claim 1, wherein assigning an internet protocol (IP) address to a virtual machine comprises automatically assigning an internet protocol (IP) address to a virtual machine.

8. The method of claim 1, wherein the virtual machine comprises a virtual machine configured in one or more modes that do not expose a media access control (MAC) address outside of a host machine.

9. A computer program product comprising a tangible computer readable recordable storage device having computer readable program code for assigning an internet protocol (IP) address to a virtual machine, said computer program product including:
- computer readable program code for tunneling a request for an IP address from one or more guest virtual machines to a dynamic host configuration protocol (DHCP) server upon boot-up of the one or more guest virtual machine, comprising:
- computer readable program code for an agent on a host machine to trap the request from the virtual machine; and
- computer readable program code for the agent to request from a tunnel server the IP address for each guest virtual machine by providing a media access control (MAC) address of each guest virtual machine;
- computer readable program code for the tunnel server to mask an identity of the one or more guest virtual machines and obtain an IP address for the one or more guest virtual machines based on the media access control (MAC) address of each guest virtual machine, comprising:
- computer readable program code for maintaining at the tunnel server, a mapping between each guest virtual machine media access control (MAC) address and a media access control (MAC) address for the host machine for exposure to the dynamic host configuration protocol (DHCP) server; and
- computer readable program code for the tunnel server to request from dynamic host configuration protocol (DHCP) server an IP address for the media access control (MAC) address of the one or more guest virtual machines;
- computer readable program code for sending to the tunnel server from the dynamic host configuration protocol (DHCP) the IP address of one or more virtual machines; and
- computer readable program code for the tunnel server to tunnel the IP address to the one or more virtual machines via the agent.

10. The computer program product of claim 9, wherein the MAC address of the virtual machine is exposed through the tunnel server.

11. The computer program product of claim 9, further comprising computer readable program code for installing one or more agents on a host machine before taking an image, wherein the one or more agents interact with the host machine and obtain a virtual MAC address of one or more guest machines and develop a host MAC to virtual MAC address.

12. The computer program product of claim 9, further comprising computer readable program code for setting up a virtual tunnel server, wherein the virtual tunnel server interacts with a boot-strapping dynamic host configuration protocol (DHCP) server configurable by an administrator to provide a new IP address.

13. The computer program product of claim 12, wherein an agent sends a request to the virtual tunnel server and registers a guest host operating system MAC identifier to a host operating system MAC identifier.

14. The computer program product of claim 9, wherein the virtual machine comprises a virtual machine configured in one or more modes that do not expose a media access control (MAC) address outside of a host machine.

15. A system for assigning an internet protocol (IP) address to a virtual machine, comprising:
- a memory; and
- at least one processor coupled to said memory and operative to:
- tunnel a request for an IP address from one or more guest virtual machines to a dynamic host configuration protocol (DHCP) server upon boot-up of the one or more guest virtual machines, comprising:
- an agent on a host machine trapping the request from the virtual machine; and
- the agent requesting from a tunnel server the IP address for each guest virtual machine by providing a media access control (MAC) address of each guest virtual machine;
- the tunnel server mask an identity of the one or more guest virtual machines and obtain an IP address for the one or more guest virtual machines based on the media access control (MAC) address of the each guest virtual machine, comprising:
- maintaining at the tunnel server, a mapping between each guest virtual machine media access control (MAC) address and a media access control (MAC) address for the host machine for exposure to the dynamic host configuration protocol (DHCP) server; and
- the tunnel server requesting from dynamic host configuration protocol (DHCP) server an IP address for the media access control (MAC) address of the one or more guest virtual machines;
- sending to the tunnel server from the dynamic host configuration protocol (DHCP) the IP address of one or more virtual machines; and
- the tunnel server tunneling the IP address to the one or more virtual machines via the agent.

16. The system of claim 15, wherein the MAC address of the virtual machine is exposed through the tunnel server.

17. The system of claim 15, wherein the at least one processor coupled to said memory is further operative to install one or more agents on a host machine before taking an image, wherein the one or more agents interact with the host machine and obtain a virtual MAC address of one or more guest machines and develop a host MAC to virtual MAC address.

18. The system of claim 15, wherein the at least one processor coupled to said memory is further operative to set up a virtual tunnel server, wherein the virtual tunnel server interacts with a boot-strapping dynamic host configuration protocol (DHCP) server configurable by an administrator to provide a new IP address.

19. The system of claim 18, wherein an agent sends a request to the virtual tunnel server and registers a guest host operating system MAC identifier to a host operating system MAC identifier.

20. The system of claim 15, wherein the virtual machine comprises a virtual machine configured in one or more modes that do not expose a media access control (MAC) address outside of a host machine.

* * * * *